Figure 1:
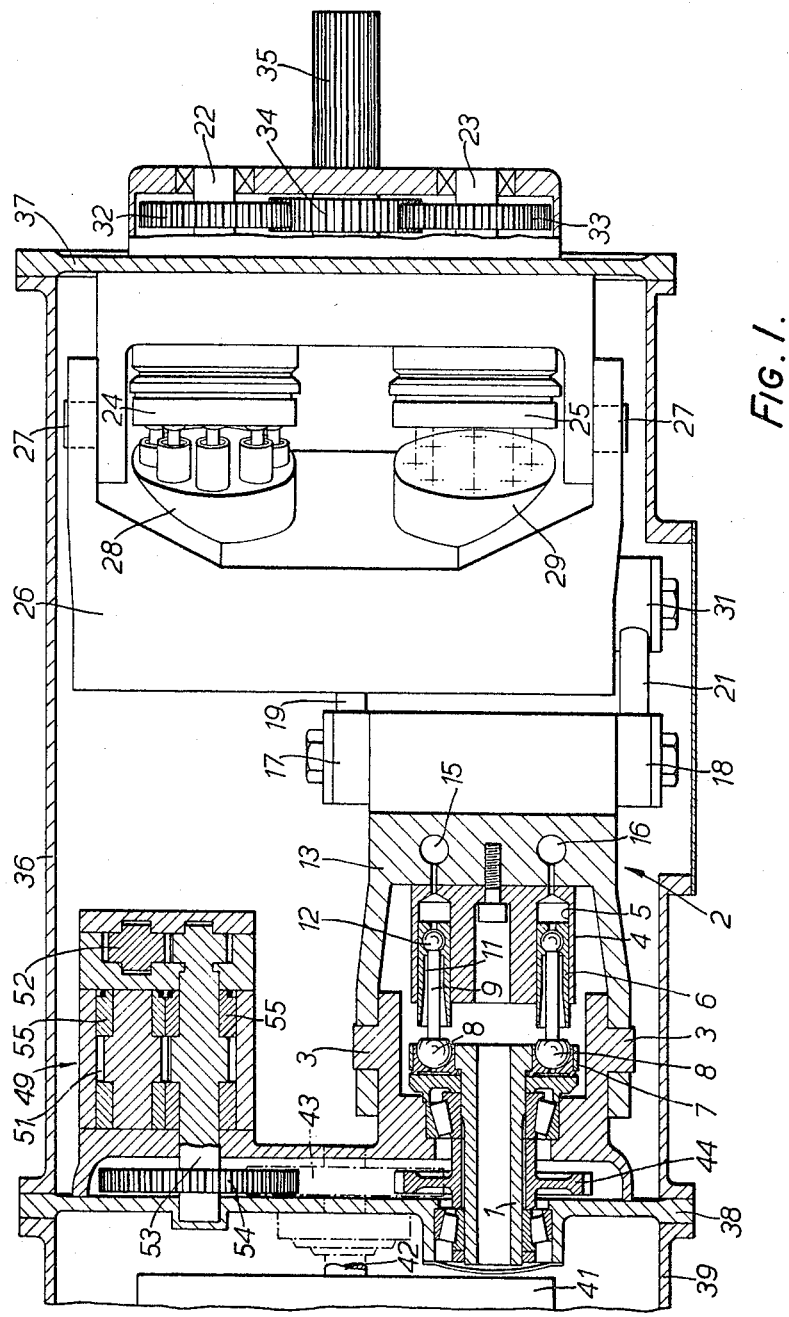

Nov. 22, 1966 G. H. DOWTY 3,286,464
HYDRAULIC APPARATUS
Filed June 2, 1965 2 Sheets-Sheet 1

INVENTOR
By George H. Dowty
Orland M. Christensen
ATTORNEY

United States Patent Office 3,286,464
Patented Nov. 22, 1966

3,286,464
HYDRAULIC APPARATUS
George Herbert Dowty, Arle Court, Cheltenham, England, assignor to Dowty Technical Developments Limited, Cheltenham, England, a company of Great Britain
Filed June 2, 1965, Ser. No. 460,873
Claims priority, application Great Britain, June 4, 1964, 23,127/64
7 Claims. (Cl. 60—53)

This invention relates to a hydrostatic power transmission.

In accordance with the present invention a hydrostatic power transmission comprises a positive displacement transmission pump, a positive displacement transmission motor having one dimension larger in size than a dimension of the transmission pump, located in close proximity to the transmission pump with the two said dimensions parallel, at least one hydraulic connection extending between the transmission pump and the motor, an auxiliary pump located close to the transmission pump in the direction of the transmission pump dimension so that the overall dimension of the two pumps is less than the dimension of the motor and lies between two planes extending from the extremes of the motor dimension at right angles thereto, and a gear or like connection between the auxiliary pump and the transmission pump.

The positive displacement transmission pump may be a tilting head pump which comprises a rotating pump shaft and a head tiltable about a tilt axis transverse to the pump shaft, the head having pistons which are reciprocated in cylinders by rotation of the pump shaft with a stroke variable by variation of the tilt angle of the head. The transmission pump dimension may be the dimension in the direction of the tilt axis.

Preferably the transmission motor is a joint tilting head motor which comprises a plurality of tilting heads, each containing cylinders having pistons which are reciprocable therein, the stroke of the pistons being variable by variation of the tilt angle of the head and the heads being securely fixed together for joint tilting movement about one tilt axis. Each tilting head is associated with a motor shaft and the plurality of the motor shafts may be geared together in order to drive one load or they may be connected independently to drive different loads. The motor dimension may be the dimension in the direction of the tilt axis.

The tilting head pump and the joint tilting head motor may be arranged as disclosed in application Serial Number 392,880, filed August 28, 1964, in the name of Thomas D. H. Andrews and entitled, "Hydraulic Apparatus." The application is of common assignment herewith, and is now U.S. Patent 3,241,319. As will be seen in the patent, the pump and motor heads are interconnected by a link for simultaneous displacement adjustment.

The auxiliary pump may be used as a make-up pump for the transmission or it may supply liquid under pressure for any purpose independent of the hydrostatic transmission. The invention provides a compact hydraulic unit which combines a hydrostatic transmission with an auxiliary pump.

Where a gear train interconnects the transmission pump shaft with the auxiliary pump shaft, two or more gears may be enclosed in a casing to form a gear pump which may be connected as a make-up pump for the transmission or alternatively it may supply liquid under pressure for a purpose independent of the transmission.

Figure 2:
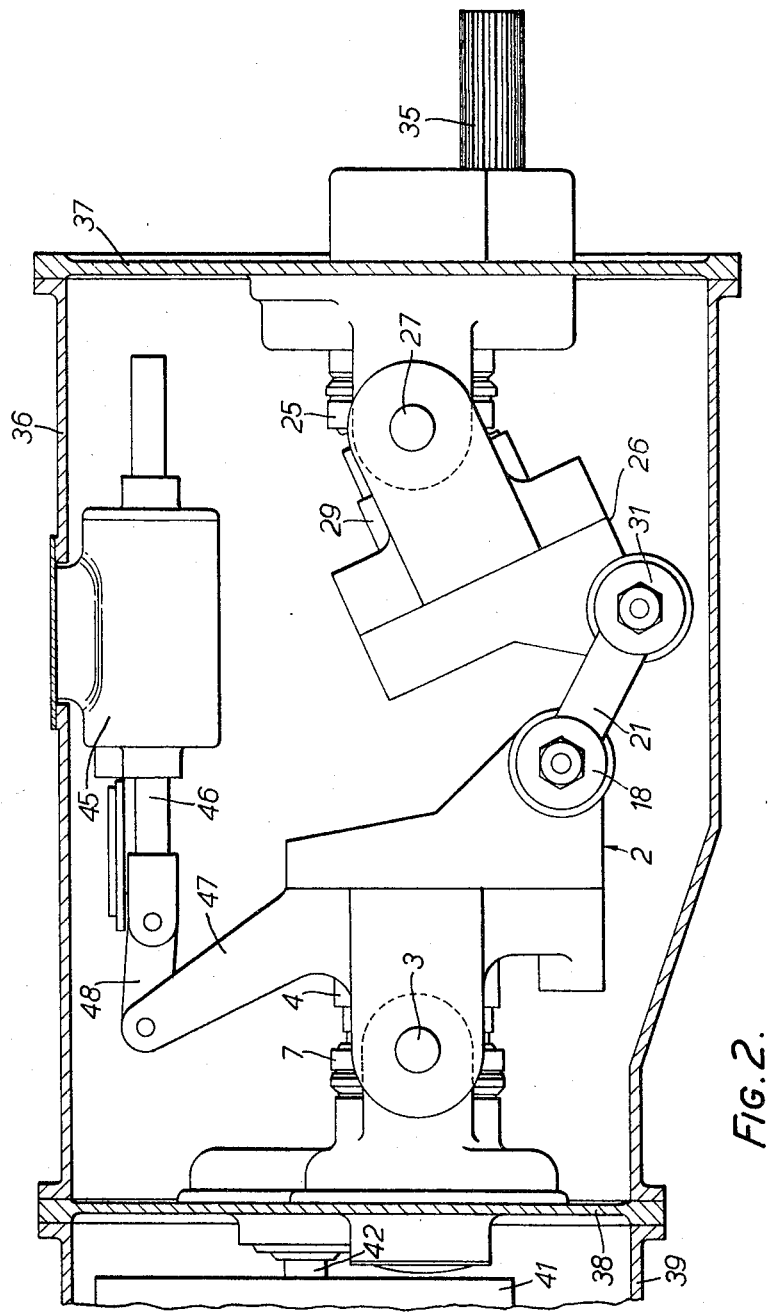

How the invention can be carried into effect is hereinafter particularly described with reference to the accompanying drawings in which, FIGURE 1 is a plan partly in section of a transmission in accordance with the invention, and FIGURE 2 is an elevation partly in section of the transmission of FIGURE 1.

In the drawings the transmission pump comprises a pump shaft 1 and a tilting head 2 mounted in trunnions 3 for tilting movement about an axis transverse to the drive shaft axis. Located within the tilting head 2 is a rotary cylindrical barrel 4 having cylinders 5 extending parallel to its rotation axis within which pistons 6 are reciprocably mounted. A drive flange 7 driven by the shaft 1 carries a number of ball joints 8 from which connecting rods 9 extend to the pistons in the cylinders. The connecting rods 9 extend through deep bores 11 in the pistons to terminate at ball joints 12 adjacent to the inner ends of the pistons. Rotation of the pump shaft 1 will rotate the drive flange 7 causing the connecting rods 9 to engage the bores 11 of the pistons to rotate the cylinder barrel. During rotation of the drive flange and the cylinder barrel the pistons will reciprocate within the cylinders if the rotation axis of the cylinder barrel is inclined to the rotation axis of the drive flange. The cylinder barrel 4 rotates on a valve plate 13 carried by the tilting head for cooperation with a pair of ports 15 and 16 therein. The ports 15 and 16 cooperate with cylinder ports during rotation of the cylinder barrel. The ports 15 and 16 are respectively connected through swivel joints 17 and 18 to a pair of hydraulic links 19 and 21.

The transmission motor is a joint tilting head motor comprising a pair of motor shafts 22 and 23 connected to drive flanges 24 and 25 and a joint tilting head 26 mounted on trunnions 27. A pair of cylinder barrels 28 and 29 are rotatably mounted within the head 26 for cooperation with the two drive flanges 24 and 25. Each of the drive flange and cylinder barrel combinations 24, 28 and 25, 29 are interconnected by pistons and connecting rods in the manner shown for the drive flange 7 and cylinder barrel 4 of the pump. The head 26 includes a pair of valve surfaces cooperating one with each cylinder barrel 28 and 29, each valve surface including a pair of ports. These pairs of ports are connected in parallel to a pair of swivel joints 31 to which the hydraulic links 19 and 21 are individually connected. The motor shaft 22 carries a gear wheel 32 and the motor shaft 23 carries a gear wheel 33. Both of these gear wheels 32 and 33 mesh with an output gear wheel 34 which drives an output shaft 35.

The whole transmission is arranged within a casing 36 which also conveniently forms a reservoir for the working liquid of the transmission. The motor is secured to one end plate 37 of the casing 36, this end plate being detachably secured by bolts (not shown). The transmission pump is supported by another end plate 38 also secured in position by bolts (not shown). The casing 36 is adapted to fit onto the flywheel casing 39 of an internal combustion engine of which only a part of the flywheel 41 is shown in the drawing. The engine crank shaft 42 extends from the flywheel into the end plate 38 where it rotates a gear 43 which meshes with a gear 44 mounted on the pump drive shaft 1. Rotational drive is thus transmitted from the engine to the pump drive shaft.

The hydraulic links 19 and 21 are formed by tubes which interconnect the pump and the motor for flow of liquid between them and also mechanically interconnect the pump and the motor heads so that they must move together for displacement adjustment. In order to adjust displacement a servo motor 45 is provided mounted on the casing 36. The servo motor 45 is a piston and cylinder unit from which a piston rod 46 extends. A lever 47 extends from the pump tilting head 2 and is connected through the medium of a pivoted link 48 with the end of the piston rod 46. The links 19 and 21 are so arranged that when the pump head 2 is in its zero displacement position, i.e., when the axis of the cylinder barrel 4 is coaxial with the axis of the drive shaft 1, the axes of the two pairs of swivel joints 17, 18 and 31 lie in one plane with the pump trunnion axis and define the maximum angular movement of the motor head about its trunnion axis from the motor zero displacement position. This position of the pump and the links will be referred to as the dead centre position. Movement of the pump head 2 in either direction from the dead centre position will reduce the angular displacement of the motor head 26 as described in our said copending application No. 392,880.

At one side of the pump head 2 at a position where it is intersected by the axis of trunnions 3 an auxiliary pump unit 49 is located. This pump unit comprises a pair of gear pumps 51 and 52. A common shaft 53 extends from the two gear pumps 51 and 52 and carries a gear 54 which meshes with the gear 43 driven by the engine. The gear pump 51 is a comparatively large gear pump provided with pressure loaded bushes 55 which co-operate in known manner with the pump gears to enable the pump to deliver a high output pressure. The gear pump 52 is a conventional gear pump without pressure loaded bushes intended to supply a small flow rate of liquid at pressure to maintain the hydrostatic transmission primed with liquid in the conventional way.

The pump unit 49 and the transmission pump head 2 are so located that they lie between two planes perpendicular to the axis of the motor trunnions 27 which pass through the outermost ends of the motor head 26. In FIGURE 1 these planes pass just inside the sections through the casing 36. In this way the pump unit 49 fits into a space adjacent to the transmission pump head 2 giving a compact arrangement. At the same time the pump unit 49 does not in any way restrict angular tilting movement of either of the tilting heads 2 or 26. The gear pump 51 is intended to supply high pressure liquid at a substantial flow rate to an external hydraulic circuit quite independent of the transmission. For example where the illustrated transmission is used on an agricultural tractor for the transmission of power from the engine to the ground engaging wheels the pump 51 may supply high pressure liquid for operation of hydraulic auxiliaries. The pump 51 may use the casing 36 as a reservoir from which to draw hydraulic liquid.

The illustrated embodiment of the invention has been particularly designed so that as seen in FIGURE 1 the engine crank shaft 42 and the transmission output shaft 35 are disposed substantially centrally of the width of the casing 36. It will be appreciated however that many other arrangements are possible within the scope of the present invention. For example, the engine crank shaft could be directly connected to drive either the transmission pump shaft 1 or the auxiliary pump shaft 53. Again alternatively the transmission output shaft 35 could be formed as an extension from either of the motor shafts 22 or 23. Within the broad scope of the invention the transmission pump and the motor need not be of the tilting head kind but could be formed by any other well known kind of unit such for example as the swash plate kind. Whilst the auxiliary pump has been shown as a pair of gear pump units it will be appreciated that any other kind of pump may be provided at this position.

I claim as my invention:

1. A hydrostatic power transmission comprising a positive displacement transmission pump, a positive displacement transmission motor having one dimension larger in size than a dimension of the transmission pump, located in close proximity to the transmission pump with the two said dimensions parallel, at least one hydraulic connection extending between the transmission pump and the motor, an auxiliary pump located close to the transmission pump in the direction of the transmission pump dimension so that the overall dimension of the two pumps is less than the dimension of the motor and lies between two planes extending from the extremes of the motor dimension at right angles thereto, and a gear or like connection between the auxiliary pump and the transmission pump.

2. A hydrostatic power transmission as claimed in claim 1 in which the transmission pump is a tilting head pump and comprises a rotating pump shaft and a head tiltable about a tilt axis transverse to the drive shaft, the head containing cylinders having pistons which are reciprocated by rotation of the pump shaft, the stroke of the pistons being variable by variation of the tilt angle of the head.

3. A hydrostatic power transmission as claimed in claim 2 wherein the pump dimension is the dimension in the direction of the pump tilt axis.

4. A hydrostatic power transmission as claimed in claim 1 in which the transmission motor is a joint tilting head motor comprising a plurality of motor shafts, a tilting head for each motor shaft, each head having pistons which are reciprocated in cylinders by rotation of the motor shaft with a stroke variable by variation of the tilt angle of the head, the heads being securely fixed together for joint tilting movement about the tilt axis which extends transversely through both motor shaft axes.

5. A hydrostatic power transmission as claimed in claim 4 in which the motor shafts are geared together to drive one output shaft.

6. A hydrostatic power transmission as claimed in claim 4 in which the motor dimension is the dimension in the direction of the motor tilt axis.

7. A hydrostatic power transmission as claimed in claim 1 in which the auxiliary pump is arranged to supply liquid at low pressure to prime the transmission.

References Cited by the Examiner

UNITED STATES PATENTS

| | | | |
|---|---|---|---|
| 2,872,876 | 2/1959 | Thoma | 60—53 X |
| 3,052,098 | 9/1962 | Ebert | 60—53 |
| 3,074,296 | 1/1963 | Ebert | 60—53 X |

EDGAR W. GEOGHEGAN, *Primary Examiner.*